United States Patent [19]

Furlan et al.

[11] 4,399,332

[45] Aug. 16, 1983

[54] PROGRAMMABLE TRAFFIC-MEASURING UNIT FOR TELECOMMUNICATION SYSTEM

[75] Inventors: Antonio Furlan; Francesco Thiella; Flavio Tibaldo, all of Venezia-Mestre, Italy

[73] Assignee: SIP - Societa Italiana per L'Esercizio Telefonico p.a., Turin, Italy

[21] Appl. No.: 268,853

[22] Filed: Jun. 1, 1981

[30] Foreign Application Priority Data

Jun. 3, 1980 [IT] Italy .............................. 67860 A/80

[51] Int. Cl.³ .......................................... H04M 3/36
[52] U.S. Cl. .................................. 179/8 A; 179/7 R; 179/175.2 R
[58] Field of Search ........ 179/8 A, 175.2 C, 175.2 D, 179/7 R, 7.1 TP, 9, 10; 370/62

[56] References Cited

U.S. PATENT DOCUMENTS

| Re. 28,109 | 8/1974 | Provenzano, Jr. et al. | 364/900 |
| 3,928,803 | 12/1975 | Hugon et al. | 364/569 |
| 4,165,447 | 8/1979 | Bertoglio et al. | 179/8 A X |
| 4,330,688 | 5/1982 | Tiribelli | 179/8 A |

FOREIGN PATENT DOCUMENTS 7624572 3/1978 France.

OTHER PUBLICATIONS

Article by P. Castex et al. titled "Présentation de l'équipement de saisie du trafic dans les organes communs Project Estoc" published in Commutation & Electronique, No. 53, Apr. 1976, pp. 13-24.
Article by A. de Flammineis et al. titled "The Automation of Maintenance and Administrative Functions in Traditonal and Electronic Switching Systems" published at International Switching Symposium, Kyoto, Japan, 25-29 Oct. 1976, pp. 433-2-1 thru 433-2-8.
Article by J. D. Smith et al. titled "A Microprocessor-Controlled Teletraffic Logging Device" published by The Post Office Electrical Engineering Journal, London, England, vol. 72, part 3, Oct. 1979, pp. 149-152.

*Primary Examiner*—Stafford D. Schreyer
*Attorney, Agent, or Firm*—Karl F. Ross

[57] ABSTRACT

A programmable unit for the recordal of traffic measurements in a telecommunication system comprises a processor which, in accordance with a stored program, cyclically scans a multiplicity of voltage sensors that are connected to incoming wires from respective signal sources such as wires of subscriber lines terminating at a central office or exchange. The sensors step down the incoming signal levels to a voltage range compatible with the operation of logical circuitry and are connected in sets of eight to respective inputs of a multiplexer whose eight-lead output multiple extends to a comparator receiving a variable threshold voltage from the processor via a digital/analog converter. The magnitude of this threshold voltage is individually determined by the program for each time slot in which a set of eight sensors is connected to the comparator; the latter delivers to the processor an eight-bit word or byte indicating the instant state of activity of the corresponding signal sources. These sources could also be constituted by the outputs of a frequency digitizer to which multifrequency-coded selection signals, dial tones, ringing frequencies and busy signals may be transmitted from the associated subscriber lines. The measuring unit could further be used to check on the operation of traffic-monitoring equipment using cascaded relays. The data supplied by the threshold comparator to the processor are recorded on a magnetic tape and/or a printer; a supplemental unit may include additional tape recorders designed to bridge the gap between cassette changes of the main recorder.

12 Claims, 19 Drawing Figures

FIG.12B

PROGRAMMABLE TRAFFIC-MEASURING UNIT FOR TELECOMMUNICATION SYSTEM

FIELD OF THE INVENTION

Our present invention relates to a programmable traffic-measuring unit forming part of a circuit arrangement for checking and recording voltage changes which occur at a multiplicity of test points in a telecommunication system, e.g. at subscriber-line terminals in a telephone exchange.

BACKGROUND OF THE INVENTION

For statistical and supervisory purposes it is known to provide voltage sensors which are periodically connectable to these test points and deliver information on the activity or state of the subscriber lines or other signal sources involved. Thus, for example, a known traffic monitor manufactured by the German firm of Siemens and Halske AG, marketed under the designation VGA 68, comprises a portable assembly of several insertion networks or loops each including a number of panels with one master relay and ten slave relays per panel, the master relays of the various panels being connected in cascade for sequential operation. Under the control of the master relay, the ten slave relays of a panel are also successively operated; with 12 armatures per slave relay, a panel is able to couple up to 120 test wires of respective telephone lines to a set of associated voltage sensors.

All these prior-art monitoring units are generally of limited applicability regarding the nature and/or the mode of operation of the signaling devices to be checked. In many instances, the voltage level varies significantly among different groups of wires so that threshold sensors with different reference voltages must be used for their testing. The aforedescribed traffic monitor VGA 68, in particular, includes means for emitting a special marking signal calling for the switching of sensors upon a changeover from one wire group to another.

OBJECTS OF THE INVENTION

The general object of our present invention is to provide a circuit arrangement for the purpose set forth which is universally applicable to the testing of voltage sources in a telecommunication—especially telephone—system while being of simple design and correspondingly compact structure.

A more particular object is to provide a circuit arrangement of this character adapted to monitor both pulsating and sinusoidal voltages.

SUMMARY OF THE INVENTION

A circuit arrangement according to our invention comprises a measuring unit which includes a multiplicity of voltage sensors that are connectable to respective voltage sources and are provided with outgoing leads whose output voltages vary within a predetermined range with the voltages of the respective sources, these outgoing leads being combined into sets each containing a plurality of such leads whose output voltages alternate between predetermined levels. A processor in the measuring unit is programmed to emit switching signals on a first output for cyclically scanning the several sets of leads and to emit coded voltage thresholds appearing coincidentally with these switching signals on a second output. A multiplexer in the measuring unit has a switching input connected to the first processor output, a multiplicity of arrays of data inputs respectively connected to the several sets of outgoing leads originating at the voltage sensors, and an output multiple carrying the output voltages of the currently scanned set of leads to a multiple input of a comparator which has another input connected via a digital/analog converter to the second processor output. In response to each emitted switching signal, the comparator delivers to the processor a multibit word wherein each bit represents in binary terms the relationship between the output voltage of a respective lead of the currently scanned set and a corresponding reference voltage derived by the digital/analog converter from the coded threshold emitted by the processor, this reference voltage lying between the predetermined voltage levels of the scanned set. The information conveyed by the bits of each word is registered, under the control of the processor, by recording means preferably comprising a magnetic-tape recorder.

Such a tape recorder, as well as a keyboard-controlled character printer which may form part of the recording means, could also be used for feeding instructions to the processor regarding modifications of the program to be executed. The processor, advantageously, is provided with a read/write memory designed to be loaded in a predetermined manner with microprograms or subroutines of the overall program under the control of an associated read-only memory. Since several voltage sources may be part of a single signaling device to be monitored, e.g. a subscriber-line termination emitting seizure, selection and answer signals on different wires, the read/write memory is preferably divided into a first area allotted to the storage of raw data relating to the status of individual outgoing leads, a second area allotted to the storage of processed data relating to the individual signaling devices, and a third area allotted to the storage of microprograms for the processing of the raw data. The second memory area will also conveniently serve as a buffer register for delivering the processed data to the recording means.

Pursuant to other features of our invention, the measuring unit may be associated with various ancillary units controlled by the processor via an output bus thereof. Such an ancillary unit may include, for example, a modified version of the aforedescribed traffic monitor VGA 68 serving as an interface between a multiplicity of telephone lines and a group of measuring wires which act as the voltage sources connectable to the sensors of the main unit. The output bus can also be used to transmit the processed information to a higher-ranking processing unit.

BRIEF DESCRIPTION OF THE DRAWING

The above and other features of our invention will now be described in detail with reference to the accompanying drawing in which.

SPECIFIC DESCRIPTION

Figure 1:
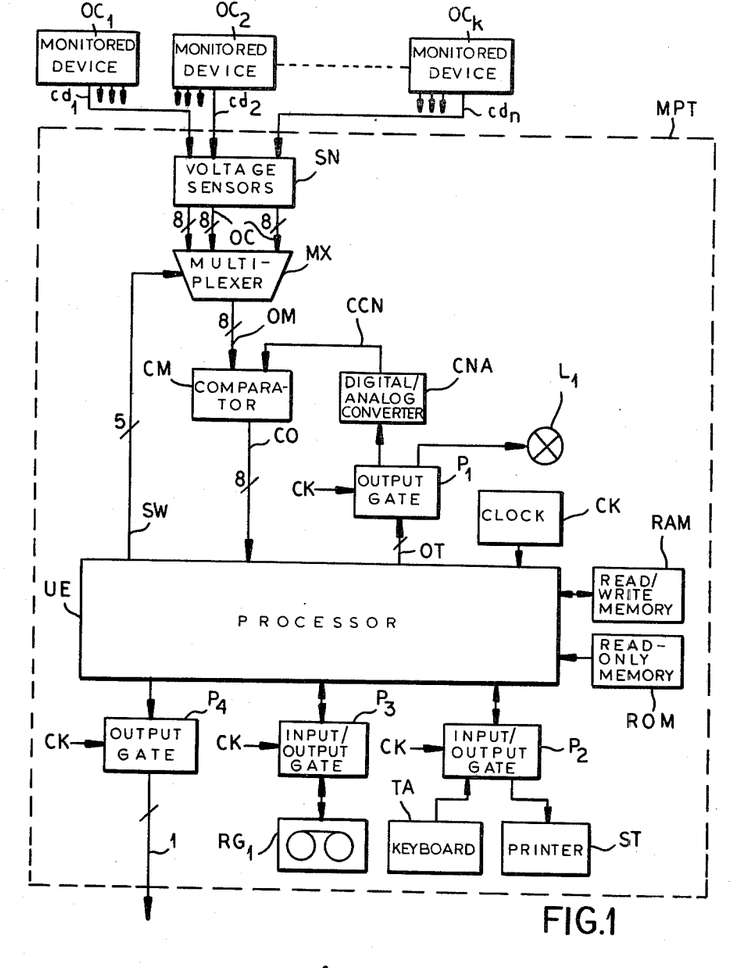
FIG. 1 is a block diagram of a circuit arrangement embodying our invention.

In FIG. 1 we have shown a multiplicity of signaling devices $OC_1$, $OC_2$ ... $OC_k$ with test wires $cd_1$, $cd_2$, ... $cd_n$ extending therefrom to respective voltage sensors collectively designated SN; although only one test wire per device has been shown in full, some or all of these devices may have several such wires extending from respective voltage sources thereof. With n=256, for example, there may be 64 devices (k=64) with four wires or 128 devices with two wires each.

Sensors SN have respective outgoing leads which are combined into respective eight-lead sets or octets OC each terminating at a corresponding array of data inputs of a multiplexer MX. In the example given, multiplexer MX has 32 positions which it cyclically assumes in response to switching signals emitted by a processor UE on a five-lead output multiple SW. Another output multiple OT of the processor delivers binary-coded voltage thresholds via a gate $P_1$ to a digital/analog converter CNA translating these thresholds into respective voltage levels that are fed by a connection CCN to a reference input of a comparator CM having data inputs connected to respective leads of an eight-lead output multiple OM originating at multiplexer MX. A similar output multiple CO of comparator CM extends to processor UE.

The processor dialogues via an input/output gate $P_2$ with a character printer ST and an associated keyboard TA as well as via another such gate $P_3$ with a magnetic-tape recorder $RG_1$ which may be of the microcassette type. An output bus 1 is connected to processor UE by way of a further gate $P_4$. All gates $P_1$–$P_4$ as well as the processor itself are controlled by a clock CK, as are a read/write memory RAM and a read-only memory ROM communicating with the processor. The operational state of the processor may be indicated by a signal lamp $L_1$ connected to at least one of the gates, here gate $P_1$.

Except for the monitored signaling devices $OC_1$–$OC_k$, all the elements so far described are components of a measuring unit MPT which also includes a nonillustrated power supply for the energization of these components. The voltages transmitted over wires $cd_1$–$cd_n$ to unit MPT may have magnitudes outside the operating range of the processor UE, e.g. between 0 and −60 V. Sensors SN proportionally convert these voltages to values in a range of, say, 0 to +12 V compatible with the operation of the logical circuitry of the processor, with allowance made even for abnormal input voltages in an extended range of −70 V to +10 V, for example.

The grouping of the outgoing sensor leads into octets OC has the advantage that the pulses appearing in each scanning cycle on the output multiple CO of comparator CM constitute an eight-bit word or byte adapted to be handled by processing equipment of the type available in PCM telecommunication systems in which such bytes are conventionally used for the coding of voice samples.

Component UE may be a microprocessor such as the one available under the designation Fairchild F8.

Memory RAM stores both the data and the microprograms for processing same. This memory may be considered divided into a number of areas including several areas assigned to respective groups of wires $cd_1$–$cd_n$ being scanned, each group being associated with a particular threshold voltage. Thus, each wire-group area will store the value of that threshold voltage, the addresses of the sensors connected to the wires of the group, the preceding state of each wire, the state last read and the variation in state, if any, determined by the last reading. Other areas are assigned to respective devices $OC_1$–$OC_k$ and are each divided into a zone allotted to the processing of signals arriving from the associated wires and a zone serving as a buffer register for data to be recorded. The first-mentioned zone contains words indicating the present state of any associated wire in which a variation has been detected, the microprogram designed to process such a variation, and data relating to times of occurrence, duration of event, number of occurrences and the like. The other zone holds the information to be read out (via suitable interfaces not shown) to recorder $RG_1$ and/or printer ST for permanent preservation, including call-number digits, length of conversations and identities of signaling devices.

A further area of memory RAM contains the several microprograms referred to above and more fully discussed below, possibly together with an ancillary debugging program. The stored microprograms may be modified, by intervention from the operator via keyboard TA or in response to instructions transmitted at certain times to the processor from recorder $RG_1$, for the purpose of correcting errors, altering existing thresholds or otherwise taking changes in operating conditions into account. The loading of the microprograms to be executed into memory RAM takes place under the control of a macroprogram stored in memory ROM. Output bus 1 may also extend to a nonillustrated higher-ranking processing unit associated with several measuring units MPT.

The voltages appearing on wires $cd_1$–$cd_n$ are assumed to be of a pulsating nature, varying between two levels. Our invention, however, is also applicable to systems for the monitoring of devices such as telephone lines carrying sinusoidal or other periodic signals as conventionally used for multifrequency dialing as well as for single-frequency supervisory signals (ringing current, dial tone, busy signal). Thus, we have shown in FIG. 2 a multiplicity of wires c, $cs_1$–$cs_m$ originating at a telephone exchange or central office CT. Wires c, which carry two-level or pulsating signals, terminate at respective voltage sensors SN (FIG. 1) of measuring unit MPT. Wires $cs_1$–$cs_m$, on the other hand, carry periodic signals of the type referred to and terminate at a frequency digitizer AM which is controlled by a branch 1' of output bus 1 and emits binary voltages (e.g. within the aforementioned range of 0 to −60 V) to other voltage sensors associated therewith.

Figure 2:
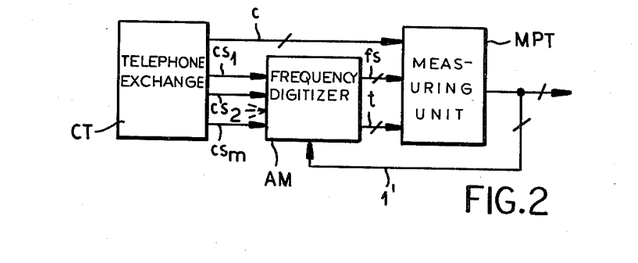
FIG. 2 is a block diagram including an ancillary frequency-digitizing unit.
Figure 3:
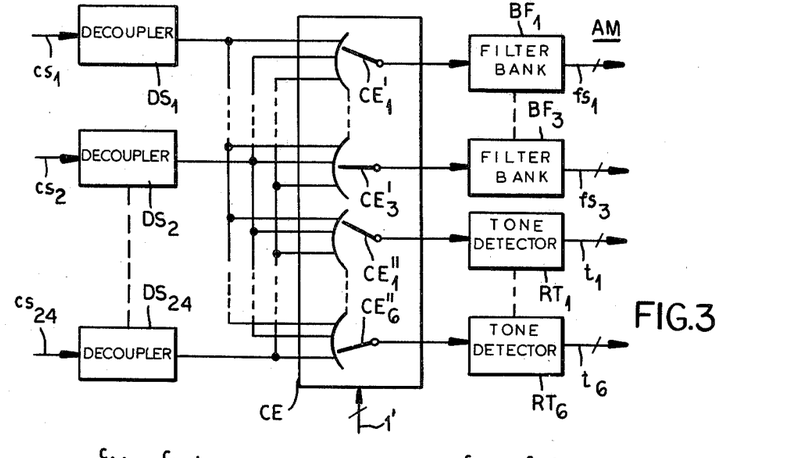
FIG. 3 is a more detailed diagram of the frequency digitizer shown in FIG. 2.

Digitizer AM, which may be regarded as an ancillary unit, is more fully illustrated in FIG. 3 which shows wires $cs_1$, $cs_2$, ... $cs_{24}$ connected via high-impedance decouplers $DS_1$, $DS_2$, ... $DS_{24}$ to respective bank contacts of a group of line finders $CE'_1-CE'_3$, $CE''_1-CE''_6$, included in a switching stage CE, whose number is considerably less than the number k (here 24) of incoming wires. Decouplers $DS_1-DS_{24}$ may consist, for example, of hybrid-coil transformers or, preferably, of operational amplifiers connected to the respective wires through RC networks of suitable time constants. Switching stage CE is controlled by branch 1' upon the detection of a line-seizure signal (transmitted over one of the wires c of FIG. 2) to position an available line finder of group $CE'_1-CE'_3$ on the corresponding bank contacts for feeding the arriving signals to a respective filter bank $BF_1-BF_3$ each working into a 12-lead submultiple $fs_1-fs_3$ which forms part of a multiple fs shown in FIG. 2. In the presence of a dialing signal, assumed to consist of two out of six available frequencies, the corresponding filter bank energizes two of the leads of its output multiple.

The chosen line finder and its filter bank remain connected to the selection wire of the calling line until the processor UE in unit MPT determines from an evaluation of the received digits that dialing has ended. At that point (unless the call has been aborted or the called party happens to respond before ringing has started, as indicated to the processor by a disconnect or an answer signal on an associated wire c) the processor, via branch 1', switches an available line finder $CE''_1-CE''_6$ to the calling line, each of these latter line finders being connected to a respective tone detector $RT_1-RT_6$ responsive to ringing and busy signals. If these two signals have different frequencies, the detector will energize one or the other of two output leads collectively designated $t_1-t_6$ in FIG. 3 and included in a multiple t shown in FIG. 2. If the busy and ringing signals are intermittent tones of the same frequency distinguished only by their durations and intervening pauses, a single output lead will suffice for each detector. The engaged tone detector and its line finder are released as soon as the processor has verified the nature of the signal.

If the selection wires of the exchange CT shown in FIG. 2 carry dial pulses instead of multifrequency signals, these pulses can be directly transmitted over wires c to the measuring unit MPT. In that case the three filter banks $BF_1-BF_3$ in the digitizer AM of FIG. 3 can be replaced by further tone detectors responsive to periodic signals.

Ancillary unit AM, as will be apparent, also serves as a concentrator reducing the number of voltage sources that must be tested to monitor the activity of a multiplicity of telephone lines. The step-down ratio of 8:1 between the wires $cs_1-cs_{24}$ and the number of submultiples $fs_1-fs_3$ could, of course, be modified according to traffic density.

Figure 4:
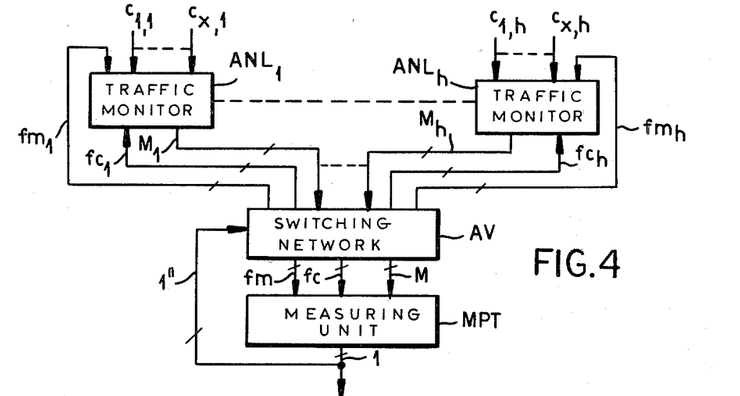
FIG. 4 is a block diagram showing a combination of the measuring unit of FIG. 1 with an ancillary unit comprising a modified traffic monitor of type VGA 68.

FIG. 4 diagrammatically illustrates the combination of our measuring unit MPT with an ancillary unit generally similar to the traffic monitor VGA 68 already referred to, a description of that conventional equipment being found for example in an article titled DISPOSITIVO PER LA MISURA DELL'INTENSITÀ DI TRAFFICO VGA 68 by Wladimir Borissoff and Reiner Rodrian of Siemens AG, published March 1969 in No. 30 of the Italian periodical Telecommunicazioni, pp. 2-9. This ancillary unit is represented in FIG. 4 by a plurality of insertion networks $ANL_1-ANL_h$ (only two shown), more fully described hereinafter with reference to FIG. 5, and by an associated switching network AV. The latter network communicates with measuring unit MPT via several outgoing multiples fm, fc and M containing extensions of respective groups of marking, control and monitoring leads $fm_1-fm_h$, $fc_1-fc_h$ and $M_1-M_h$ which lie between the switching network AV and the several insertion networks. Switching network AV is controlled by a branch 1'' of output bus 1 of unit MPT. Each insertion network $ANL_1-ANL_h$ has inputs connected to respective test wires $c_{1,1}-c_{x,1}$, ... $c_{1,h}-c_{x,h}$ of as many telephone lines.

Figure 5:
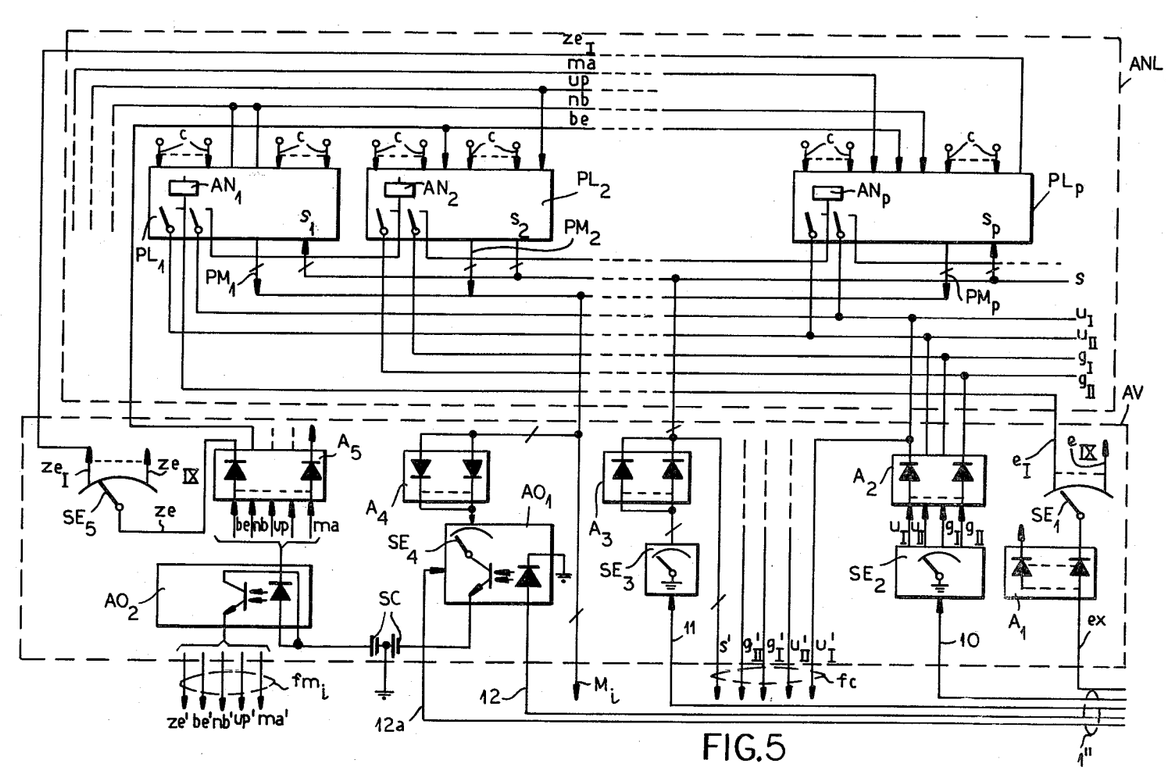
FIG. 5 shows details of the modified traffic monitor of FIG. 4.

The representative insertion network $ANL_i$ depicted in FIG. 5 comprises a plurality of panels $PL_1$, $PL_2$, ... $PL_p$ each including a master or insertion-control relay $AN_1$, $AN_2$, ... $AN_p$ and a group of ten slave or coupling relays (not shown) which are activated by the associated master relay and are each provided with 12 armatures. Thus, a total of 120 test wires c can be connected by each panel to an associated branch $PM_1$, $PM_2$, ... $PM_p$ of a 12-lead submultiple which forms one of the lead groups $M_1-M_h$ and has an extension $M_i$ included in the multiple M of FIG. 4. The consecutive energization of the several slave relays in the operated state of the associated master relay $AN_1$ etc. is determined by branches $s_1$, $s_2$, ... $s_p$ of a submultiple s common to all insertion networks. These insertion networks further include several control wires $u_I$, $u_{II}$, $g_I$, $g_{II}$ which, together with branches of submultiple s, form the lead groups $fc_1-fc_h$ of FIG. 4 with extensions $u_I'$, $u_{II}'$, $g_I'$, $g_{II}'$, s' included in the multiple fc; marking wires ze, be, nb, up, ma, individual to each insertion network, constitute the lead groups $fm_1-fm_h$ and have extensions ze', be', nb', up', ma' forming part of a submultiple $fm_i$ included in multiple fm of FIG. 4. Wires $u_I$, $u_{II}$, $g_I$, $g_{II}$ control, as in the conventional equipment, the operation and holding of the master relays of alternate panels in each insertion network.

Switching unit AV comprises, for each insertion network $ANL_i$, two manual selectors $SE_1$ and $SE_5$ (only one of each shown) along with three automatically operating sequencers $SE_2$, $SE_3$ and $SE_4$. Selector $SE_1$ has a settable contact arm connected, in parallel with the contact arms of corresponding selectors assigned to the other insertion networks, to a lead ex forming part of the multiple 1'' branched off the output bus 1 of unit MPT; the selector is further provided with nine bank contacts connected to respective leads $e_I-e_{IX}$ which extend to the operating windings of the master relays of the first nine panels, as particularly illustrated for lead $e_I$ and relay $AN_1$, in order to allow any one of these panels to be chosen as the starting point for the scanning of a series of test wires c served by network $ANL_i$. Selector $SE_5$ has an arm connected to marking wire ze and nine bank contacts connected to respective leads $ze_I-ze_{IX}$ which are tied to make contacts of the last slave relays of the last nine panels, as particularly illustrated for lead $ze_I$ and panel $PL_p$, in order to signal the end of a meausuring cycle started with the operation of the master relay designated by selector $SE_1$. Selector $SE_5$, like selector $SE_1$, is one of p independently settable selectors associated with each insertion network $ANL_1-ANL_h$.

Sequencer $SE_2$ is stepped by command pulses from processor UE (FIG. 1) via a lead 10 of multiple 1'' to energize cyclically the associated control wires $u_I$, $U_{II}$, $g_I$ and $g_{II}$ for the successive energization of the cascaded master relays of the panels of all insertion relays, starting with those marked by the corresponding selectors $SE_1$. Similar command pulses on a lead 11 of multiple 1" connected to sequencer $SE_3$, recurring at a considerably faster rate, control the cyclic energization of the wires included in submultiple s. Sequencer $SE_4$, whose bank contacts are respectively tied to the 12 monitoring leads of submultiple $M_i$, is steppable by command pulses on a lead 12a of multiple 1" and has an arm connected to the negative terminal of an ancillary battery SC by way of a phototransistor included in an opto coupler $AO_1$ which has a light-emitting diode energizable via a lead 12 of the same multiple. Component $SE_4$ is representative of programmers, one for each submultiple, controlled by leads 12 and 12a. Another opto coupler $AO_2$ is representative of five such couplers, each having counterparts for all the other insertion networks, and has a light-emitting diode connected between the positive terminal of d-c source SC and wire ze whereby this diode conducts when the slave relay designated by the associated selector $SE_5$ attracts its armatures; coupler $AO_2$ has a phototransistor inserted between positive potential and extension lead ze' of submultiple $fm_i$ for transmitting an end-of-cycle pulse to the processor. In an analogous manner, the other four opto couplers represented by component $AO_2$ report the energization of marking wires be, nb, up and ma (via their respective LEDs) to the processor by way of extension leads be', nb', up' and ma'.

More particularly, and in conformity with a conventional traffic monitor as described in the aforementioned article by Borisoff and Rodrian, current on wire be marks the end of a scan of a group of wires whose voltages alternate between the same levels (e.g. 0 and −48 V) and which adjoins a differently operating wire group. As this calls for a change in reference voltage, the signal on wire be is immediately followed by the energization of marking wire up through an adjacent coupling relay which in the conventional apparatus causes a modification of the operating thresholds of the sensors. In our measuring unit MPT, however, the corresponding pulse on lead up' gives rise to a programmed change in the code delivered by processor UE (FIG. 1) via multiple OT, gate $P_1$ and converter CNA to comparator CM without affecting the voltage sensors SN. The presence of opto couplers $AO_1$, $AO_2$ also distinguishes over the known traffic monitor, as does the use of a tape recorder $RG_1$ in lieu of a perforator.

The energization of marking wire ma has a significance similar to that of wire be but also signals a separation between successive wire groups and therefore need not be followed by a threshold-changing signal on wire up. Such a separation may be brought about by the presence of unused test-wire connections, marked by the energization of lead nb; thus, processor UE responds to a pulse on lead up' by disregarding the incoming bits relating to the corresponding sensors. The energization of the LED of coupler $AO_1$ via lead 12 enables the determination, by a voltage sensor connected to a monitoring lead selected with the aid of sequencer $SE_4$, whether the corresponding test wire is grounded or open-circuited if no negative voltage appears thereon in the absence of such energization; thus, the processor is able to distinguish between three different states of that wire.

When the measuring unit MPT of FIG. 1 is used with the traffic monitor $ANL_1$–$ANL_h$, AV of FIGS. 4 and 5, the control and marking multiples fc and fm may work directly into the processor UE while bypassing the voltage sensors SN. The several submultiples $fm_1$–$fm_h$ of multiple fm, however, are to be scanned concurrently with the corresponding submultiples $M_i$ of monitoring multiple M by another multiplexer in step with component MX. Since each submultiple $M_i$ contains 12 leads, it will be convenient to replace in this instance the eight-lead output multiples OC, OM, CO of FIG. 1 by 12-lead multiples; alternatively, of course, the number of armatures of each coupling relay of panels $PL_1$–$PL_p$ and the number of leads in each submultiple $M_i$ could be reduced to eight.

A number of amplifiers $A_1$–$A_5$ in series with components $SE_1$–$SE_5$ have been symbolized by diodes.

Figure 6:
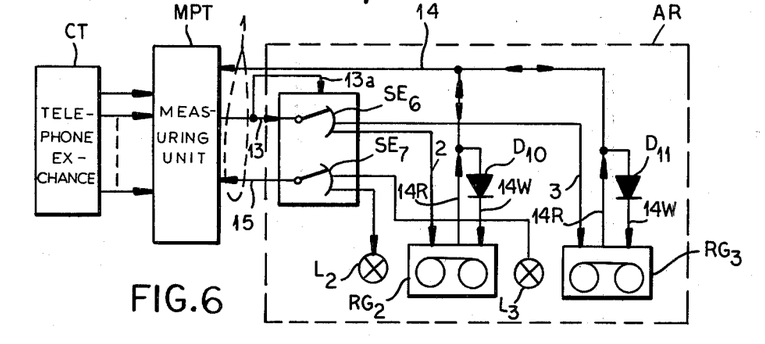
FIG. 6 is a block diagram including another ancillary unit provided with supplemental tape-recording means.

As illustrated in FIG. 6, the output bus 1 of measuring unit MPT, again connected to an exchange CT, extends to ancillary unit AR which contains several additional microcassette recorders $RG_2$, $RG_3$ (only two shown) whose operation can be controlled by a multiple 13 in bus 1 with the aid of a selector $SE_6$ settable by one or more leads 13a of that multiple. Data to be recorded arrive from the processor UE (FIG. 1) of unit MPT via a two-way multiple 14 with writing branches 14W including sets of diodes $D_{10}$, $D_{11}$; instructions to be fed back to the processor pass through the same multiple via reading branches 14R thereof. Another lead 15 of bus 1 serves for the energization of respective signal lamps $L_2$, $L_3$, via a selector $SE_7$ ganged with selector $SE_6$, to indicate whether either recorder $RG_2$, $RG_3$ is operating.

Thanks to the availability of these additional recorders, unit MPT can function without interruption when the main recorder $RG_1$ (FIG. 1) signals the processor that it is used up and requires replacement. The number of successively activable recorders in unit AR could, of course, be freely chosen according to operating conditions and storage capacity.

We shall now describe, with reference to FIGS. 7–12B, the operation of the processor UE of unit MPT in conjunction with microprograms particularly designed for monitoring the activity of telephone lines in an exchange such as that shown at CT in FIGS. 2 and 6. Among the checks to be performed in such a system, the following may be mentioned by way of example:

Traffic measurements with reference to destinations as determined by call-number digits, including number and duration of engagements with possible distinction between day and night or workday and holiday traffic;

quality control of metering-pulse generators on the basis of pulses detected for a given trunk connection;

analysis of the distribution of engagement durations in relation to origins and destinations of the calls;

establishment of correlation between engagement durations and rates charged for long-distance calls.

In discussing the operation of memory RAM in relation to the various flow charts of the drawing, reference will be made to a number of program words used by the processor. Some of these words, associated with the octets OC of FIG. 1, can be called "wire bytes" since their bits relate to the activity of respective line wires as discussed above. Most of the abbreviations given below appear in the annexed flow charts. The following wire bytes may be distinguished:

TEN: threshold voltage, identical for all 8 wires;

MUX: address of the 8 voltage sensors associated with the wire octet;

C: word in which each bit denotes the state of the preceding reading of a respective wire;

K: word in which each bit represents the instant logic state of a respective wire being scanned;

Q: word in which each bit represents a detected variation in the logic state of a respective wire;

MSO: word in which each bit indicates whether the logic state of a respective wire is to be considered true with a voltage above or below threshold voltage TEN;

MAND: masking word in which each "0" bit indicates a wire whose state is not to be analyzed;

IBPF: word containing a single "1" bit identifying the first wire analyzed in an octet;

NFB: word indicating how many wires of the octet are to be analyzed.

In each wire-group area of the memory, the wire bytes are preceded by words indicating the type of wire examined and the number of octets in the group. There is also a group code and a two-word code for the address, in memory ROM, of a so-called wire program initiated by a state variation. A number of further words (e.g. 10) may be provided for defining the nature of each octet, as by identifying the lines to which it belongs. The following words are designed to preserve, in a so-called "save area" of the memory, the information necessary for a resumption of the program after an interruption due for example to the arrival of a clock pulse:

PRGFX: address code of wire program;
BFE: identity of the wire byte under test;
F0: identification of the wire and of the device under test;
BE: bit under test in the wire byte;
BQ: word Q under test;
BK: word K under test;
NFB: number of wires to be analyzed in the octet;
NBGR: number of octets in the group.

Each device area of memory RAM, divided into two zones as noted above, contains in its signal-processing zone a so-called "state byte" for each wire of the respective telephone line, specifically a seizure wire, a selection wire and an answer wire in the case here contemplated. The state bytes indicate which microprogram or subroutine is to be executed in order to process a detected change and to update the contents of the respective memory area; the results of processing are written in a part of that area which may be referred to as a data store. Other words in the several device areas are designed to register the occurrence of signal variations, to act as pulse or digit counters, and to serve as pointers for writing in the buffer zone preparatorily to a transfer to the interface associated with the tape recorder; words to be read out also to the interface associated with the printer may be characterized by a special discriminating bit.

The following words are utilized in the device areas of the memory:

SEL: state byte of selection wire;
TSEL: words registering instants relating to selection;
IMP: state byte of seizure wire;
TIMP: words registering instants and durations relating to seizure;
RISP: state byte of answer wire;
TRISP: words registering instants relating to answer and duration of conversation;
NIS: maximum number of answer pulses;
CNIS: counter of the number of pulses to be processed on the answer wire;
NSB: number of half-bytes written in data store to register dialed digits;
EC: counter of dialing pulses;
NORG: identification number of involved device;
DO: seizure duration;
CIFRE: words registering dialed digits (half-bytes) and signals preceding an end-of-selection character;
R: answer character registered after the digits;
DC: duration of conversation;
CTR: check byte confirming the occurred data transfer into buffer zone;
PCTR: position of check byte CTR;
PRISP: work indicating the occurred answer and the position of the answer character R in the data store.

The group of words from NORG to CTR form the aforementioned data store which varies in length according to the number of bytes and half-bytes denoted by CIFRE; this makes it necessary to use the words PRISP, NSB and PCTR to indicate the positions of respective bytes or characters in that store. Word CNIS, when read out from memory ROM, has a value which may differ for various exchanges according to the number of pulses that can appear on the answer wire before the end of selection is verified.

Figure 7:
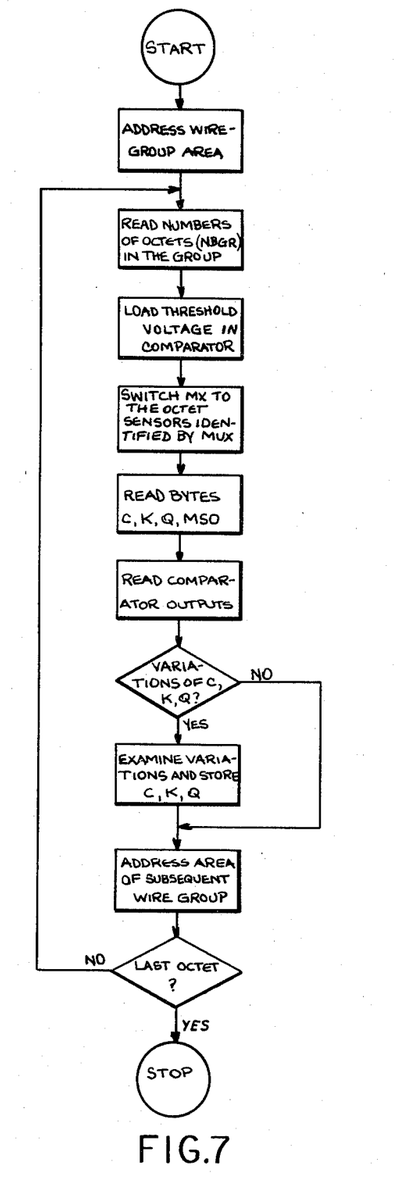
FIG. 7 is a flow chart of a wire-scanning microprogram to be carried out by a processor in the measuring unit of FIG. 1.

Wire Scanning (FIG. 7)

This microprogram loads a wire-group area of memory RAM with wire bytes determined by the bit combinations supplied to the processor via multiple CO (FIG. 1) in each position of multiplexer MX. According to the usual practice in telecommunication systems, a change in the state of a given wire is accepted as final—and thus reflected in a modification of the corresponding state byte—only after two or possibly more consecutive recurrences of the new voltage level.

The microprogram of FIG. 7, which is identical for all wire groups, is periodically performed for each group, beginning with "START" and ending with "STOP" after all the wires of the group have been scanned.

Figure 8:
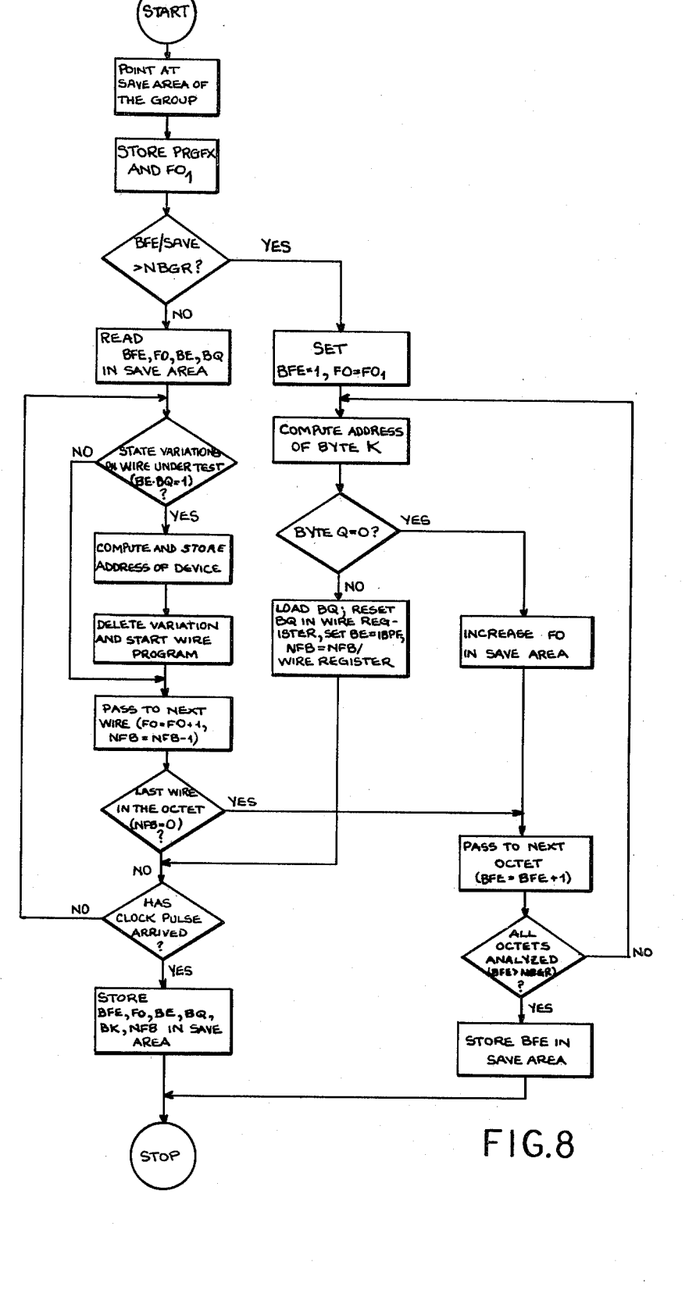
FIG. 8 is a similar flow chart of a variation-analyzing microprogram of the processor.

Variation Analysis (FIG. 8)

This microprogram detects the state variations registered in any wire-group area and initiates the wire program to be executed in response thereto. This requires entry of the addresses of the corresponding wire-group area and of the starting point of the routines forming part of the wire program; since the latter may be interrupted by clock pulses, the aforementioned save area of the memory must also be accessed.

At the start of this microprogram, therefore, the processor must check whether an analysis of an octet in the group is yet to be completed. As will be apparent from FIG. 8, the end of the analysis of all the octets of the group is marked by a word BFE which has a numerical value exceeding by 1 the number of octets in the group given by word NBGR. Depending on the outcome of the check, the analysis of the preceding group is completed or an analysis of the next group is begun. After the processing of each wire, the occurrence or nonoccurrence of an interruption by the arrival of a clock pulse is ascertained; if such a clock pulse has arrived, the various parameters are stored in the save area for subsequent resumption of the microprogram. When all octets of a group have been examined, only the identity of the last octet is stored in that area.

The wire-group areas and device areas of the memory will be collectively referred to hereinafter as the wire register and the device register, respectively.

Figure 9A:
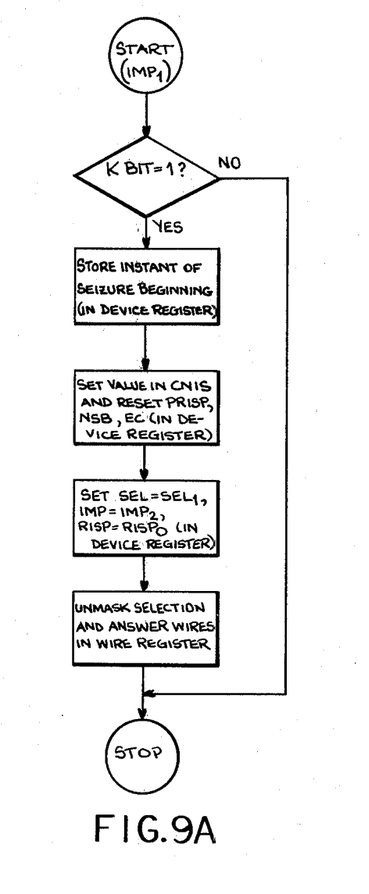
FIGS. 9A and 9B are flow charts of microprograms for line-seizure processing.
Figure 9B:
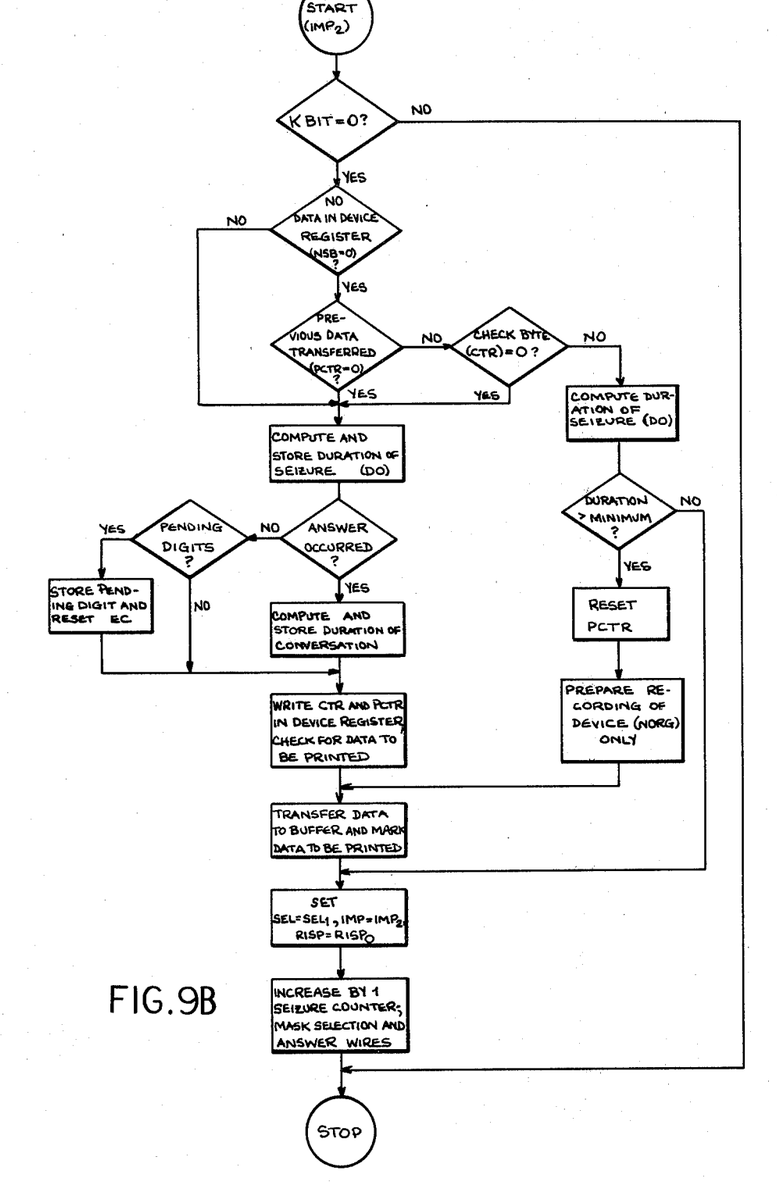

Seizure (FIGS. 9A, 9B)

This microprogram comprises two subroutines for processing the beginning (FIG. 9A) and the end (FIG. 9B) of a line seizure or engagement.

The subroutine represented by the flow chart of FIG. 9A starts with a state byte $IMP_1$ and uses a check on the corresponding state bit of word K to determine whether the detected state variation signifies in fact the beginning rather than the end of an engagement. Since this is the first event of the program involving the line in question, words NSB, PRISP and EC are to be reset; the setting of counter CNIS makes use of the value permanently stored for this counter in memory ROM. The unmasking of the associated selection and answer wires involves the setting to "1" of the corresponding bit of word MAND in the wire register. The state bytes for the seizure, selection and answer wires are updated in the device register by making $IMP=IMP_2$, $SEL=SEL_1$ and $RISP=RISP_0$. This sets the stage for detection of the end of seizure, the beginning of the first dialing pulse and the beginning of an answer, respectively. The end of the subroutine at "STOP" signifies, as in the case of all other subroutines of the wire program, a return to the variation-analyzing microprogram.

The subroutine for processing the end of seizure, represented by the flow chart of FIG. 9B, starts with the word $IMP_2$ and again includes an initial check of the corresponding wire bit of word K in order to terminate this subroutine if that check fails to reveal an actual end of seizure. An examination of words NSB and PCTR determines the number of registered call-number digits and confirms the execution of the transfer of the previously processed data to the buffer zone. If no digits or signals have been registered, the seizure is considered unsuccessful; if there has been no transfer, only the line-identification number (NORG) is recorded as a sign that an overlap has occurred. If a transfer has been made but the engagement duration DO is less than a certain minimum, no recording takes place.

Under normal conditions, i.e. if there are registered digits and the processed data have been properly transferred, the engagement duration DO is computed and stored, along with the duration of conversation if an answer is found to have occurred. If no answer has arrived, it is necessary to ascertain with the aid of counter EC whether a digit is still pending, i.e. whether the last digit has not yet been fully processed. Once this is done, the exact length of the data store is known and is marked by the check byte CTR whose position in the memory is indicated by word PCTR. This enables the processor to determine, on the next seizure, whether the registered data have been properly transferred to the buffer zone of the device register. The data so transferred can be delivered to the recorder $RG_1$ and, possibly, also to the printer ST of FIG. 1.

Before the end of this subroutine, the state bytes of the three line wires are reset and an engagement counter in the processor is incremented. The selection and answer wires are masked by setting to "0" the corresponding bits of word MAND; if an answer has occurred, this masking is performed in the course of the answer-processing subroutine to be described with reference to FIG. 12B.

Selection (FIGS. 10A–10C, 11A–11D)

Figure 11A:
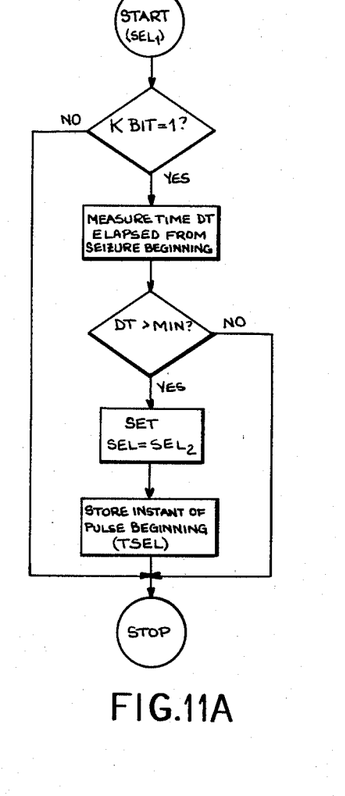
FIGS. 11A–11D are flow charts of selection-processing microprograms.

The selection-processing microprogram consists of four subroutines corresponding to different events, with possible modifications of the second and third subroutines in the case of intervention of spurious transients during dialing. FIG. 11A shows the subroutine for processing the first dialing pulse after seizure, beginning with a state byte $SEL_1$. The second subroutine, shown in FIG. 11B, processes the end of a dialing pulse and the beginning of an ensuing pause; its start may be a word $SEL_2$, $SEL_{2C}$ or $SEL_{2CC}$. The third subroutine, shown in FIG. 11C, starts with a word $SEL_3$, $SEL_{3C}$ or $SEL_{3CC}$ and processes the end of a pause and the beginning of a subsequent dialing pulse. The fourth subroutine, FIG. 11D, processes the beginning of a first pulse following a pulse of inordinate length and starts with a word $SEL_4$. Word $SEL_{2C}$ indicates that the pulse under examination was preceded by an unduly short pause, word $SEL_{2CC}$ occurs when that short pause in turn was preceded by an unduly short pulse, word $SEL_{3C}$ identifies the pulse last received as having been unduly short, and word $SEL_{3CC}$ denotes an unduly short pause preceding that short pulse. All four routines begin with a check of the corresponding wire bit of word K.

Figure 10A:
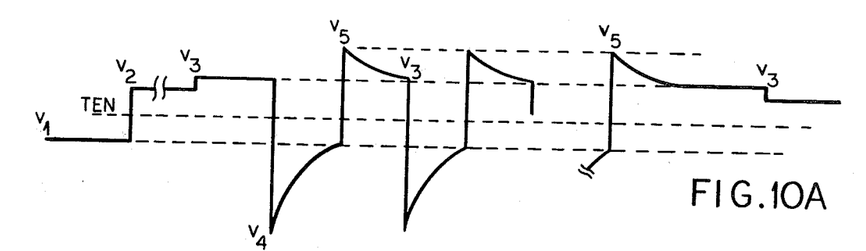
FIGS. 10A–10C are voltage diagrams illustrating normal and abnormal dial-pulse configurations.

FIG. 10A shows part of a train of dialing pulses without noise interference. Before the first pulse arrives, the selection wire is at a voltage level $v_1$ below the threshold TEN; this condition corresponds to an open-circuited line before the subscriber's handset is lifted off the hook. Closure of the hook switch establishes a voltage $v_2$ above the threshold which, upon a winding-up rotation of the dialing disk, rises to a level $v_3$. The first dialing pulse drops the voltage to a low point $v_4$ from which it gradually returns to level $v_1$ during the following pause; on the second pulse the voltage reaches a high point $v_5$, returning to level $v_3$ at its end. After the last pulse, the voltage again briefly returns to level $v_3$ and then drops back to level $v_2$ as the disk comes to a stop.

Figure 10B:
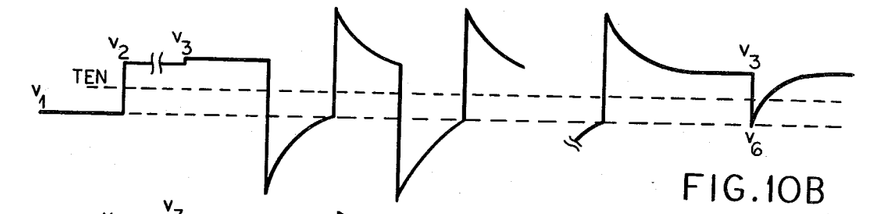
Figure 10C:
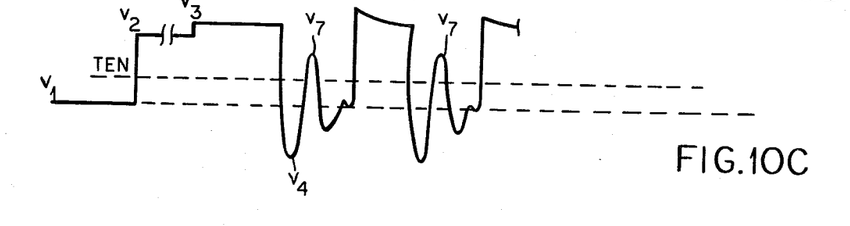

FIG. 10B represents the case of a transient pulse occurring at the end of the train of dialing pulses, with the voltage briefly dropping to a level $v_6$ approximately equal to voltage $v_1$. FIG. 10C shows a spurious rise to a level $v_7$, above threshold TEN, during generation of the first and the second dialing pulse.

In connection with FIG. 11A it should be noted that, for the suppression of noise, the first pulse is accepted as the beginning of selection only if a time DT greater than a predetermined minimum has elapsed between the line seizure and the generation of that pulse. The registration of state word $SEL_2$ enables the end of this pulse to be recognized by the subroutine of FIG. 11B. With a pulse other than the first one, this subroutine may start with word $SEL_{2C}$ or $SEL_{2CC}$ as will become clear hereinafter.

Figure 11B:
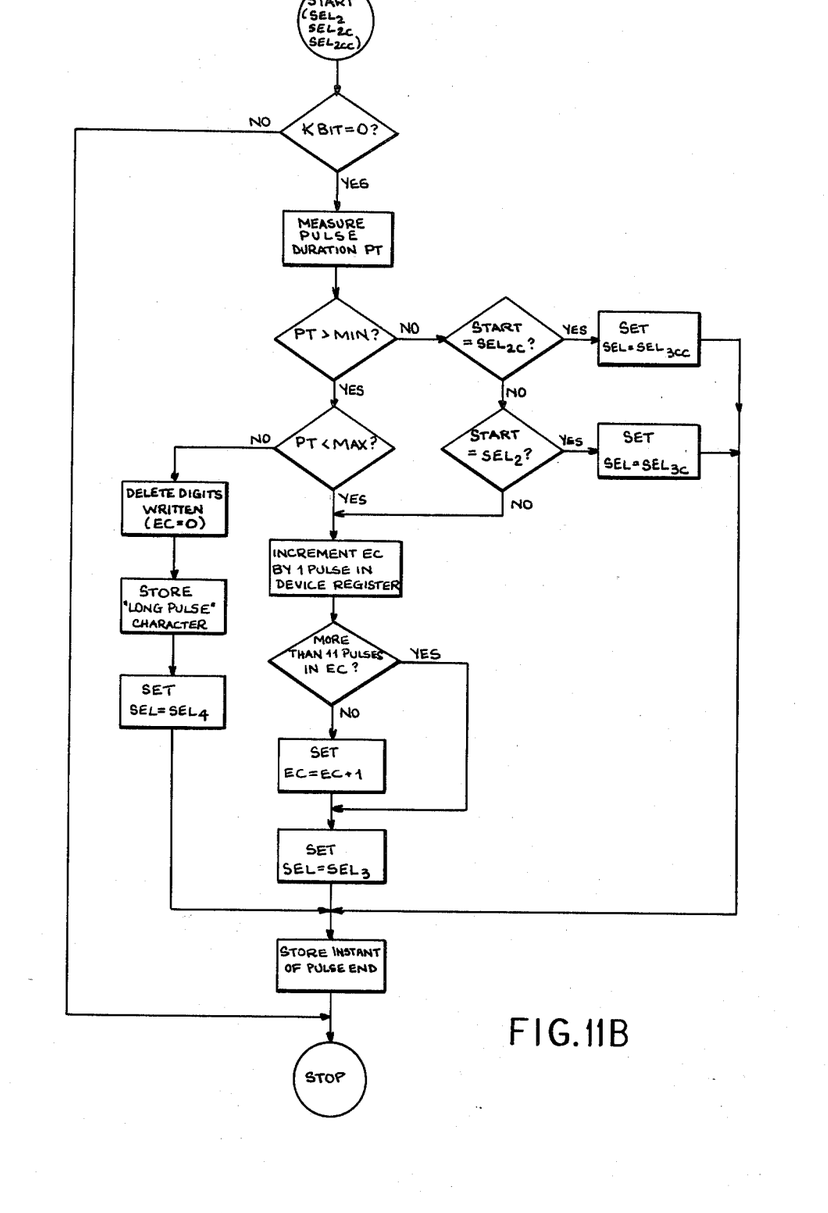

The ascertainment of the pulse duration PT in accordance with the flow chart of FIG. 11B, measured from the first state change registered by word TSEL in FIG. 11A ($SEL=SEL_1$ or $SEL_3$, K bit going to 1) to the second state change ($SEL=SEL_2$, K bit going to 0), allows the noise of FIG. 10C to be filtered out. Thus, the processor is able to discriminate among short pulses (e.g. $PT \leq 25$ ms), long pulses (e.g. $PT \geq 85$ ms) and regular pulses of intermediate duration. A long pulse causes a resetting of the pulse counter ($EC=0$), the entry of a special character and the setting of the state byte to $SEL_4$ for a possible start of the subroutine of FIG. 11D in the event of the arrival of a new dialing pulse.

A short pulse sets the state byte to $SEL_{3C}$ if the subroutine started with $SEL_2$, i.e. if this is the first pulse or if the preceding pause was of normal length. If the starting byte was SEL$_{2C}$, indicating a preceding short pause, the new byte becomes SEL$_{3CC}$. If, however, the short pause followed a short pulse as indicated by a starting byte SEL$_{2CC}$, the situation of FIG. 10C is recognized and the remaining steps are the same as with a regular pulse, including incrementation of pulse counter EC and setting of SEL=SEL$_3$ as well as storage of the instant of the pulse end to enable the measurement of the duration of the following pause.

Figure 11C:
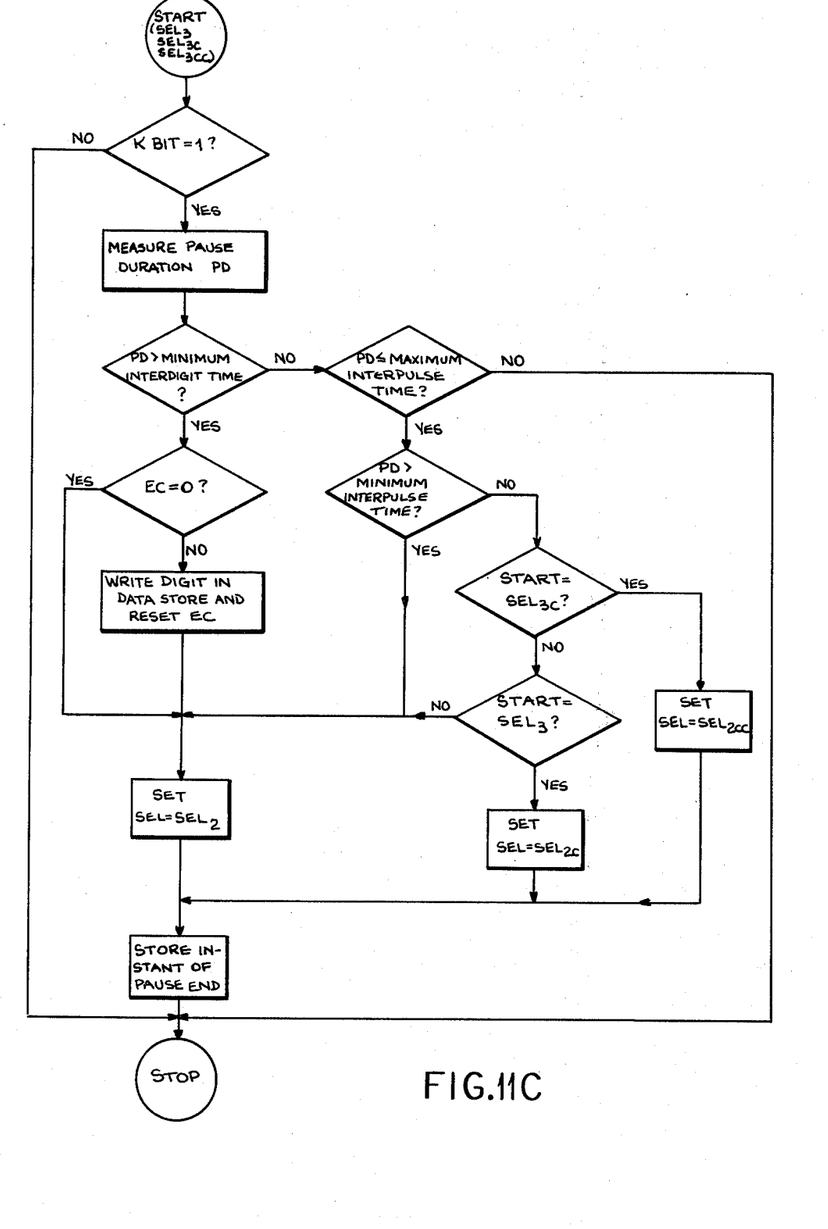

The subroutine of FIG. 11C thus also has three possible starting bytes SEL$_3$, SEL$_{3C}$ and SEL$_{3CC}$. The pause duration PD is measured, in a manner analogous to that used for the pulse duration PT, to discriminate among short pauses (e.g. PD≦25 ms), regular interpulse pauses (e.g. 25 ms<PD≦80 ms), anomalous pauses (e.g. 80 ms<PD≦300 ms) and interdigital pauses (e.g. PD>300 ms). Short pauses are processed in a manner analogous to that used for short pulses, giving rise to a state byte SEL$_{2C}$ or SEL$_{2CC}$ with a starting byte SEL$_3$ or SEL$_{3C}$, respectively; in the case of a starting byte SEL$_{3CC}$, indicating a short pulse preceded by a short pause as in FIG. 10C, the result is the same as with a regular interpulse or interdigital pause, i.e. a setting of SEL=SEL$_2$. In the case of an interdigital pause, furthermore, the dialed digit is registered if at least one pulse has been counted as determined by a check of word EC. An anomalous pause, such as that created by a noise pulse interrupting an interdigital pause as shown at v$_6$ in FIG. 10B, terminates the subroutine without changing the state byte whereby a resumption of that subroutine in light of the unprocessed state change reveals a pause duration PD in the interdigital range. Except in the anomalous case, the instant of occurrence of the end of the pause is stored to enable determination of the duration PT of the next pulse.

Figure 11D:
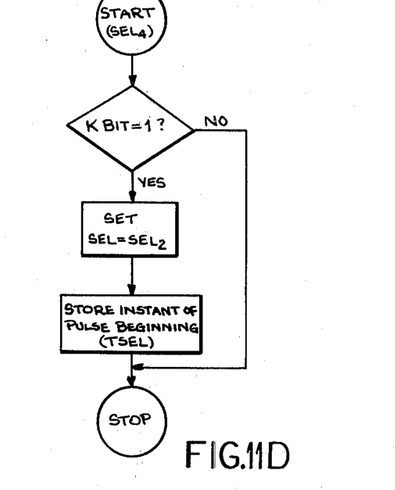

The subroutine of FIG. 11D (starting byte SEL$_4$) corresponds to that of FIG. 11A, except for the omission of the measurement of time DT, since the pulse under examination is being treated as the beginning of a digital train.

Figure 12A:
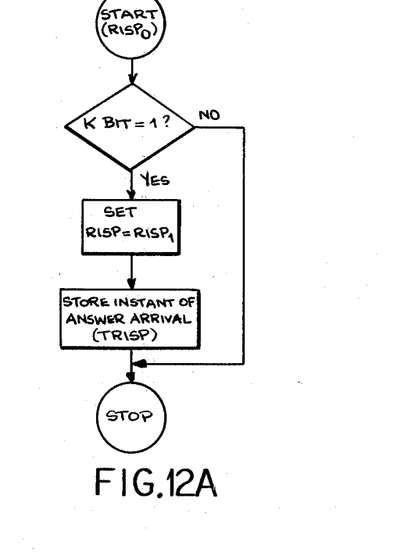
FIGS. 12A and 12B are flow charts of answer-processing microprograms.
Figure 12B:
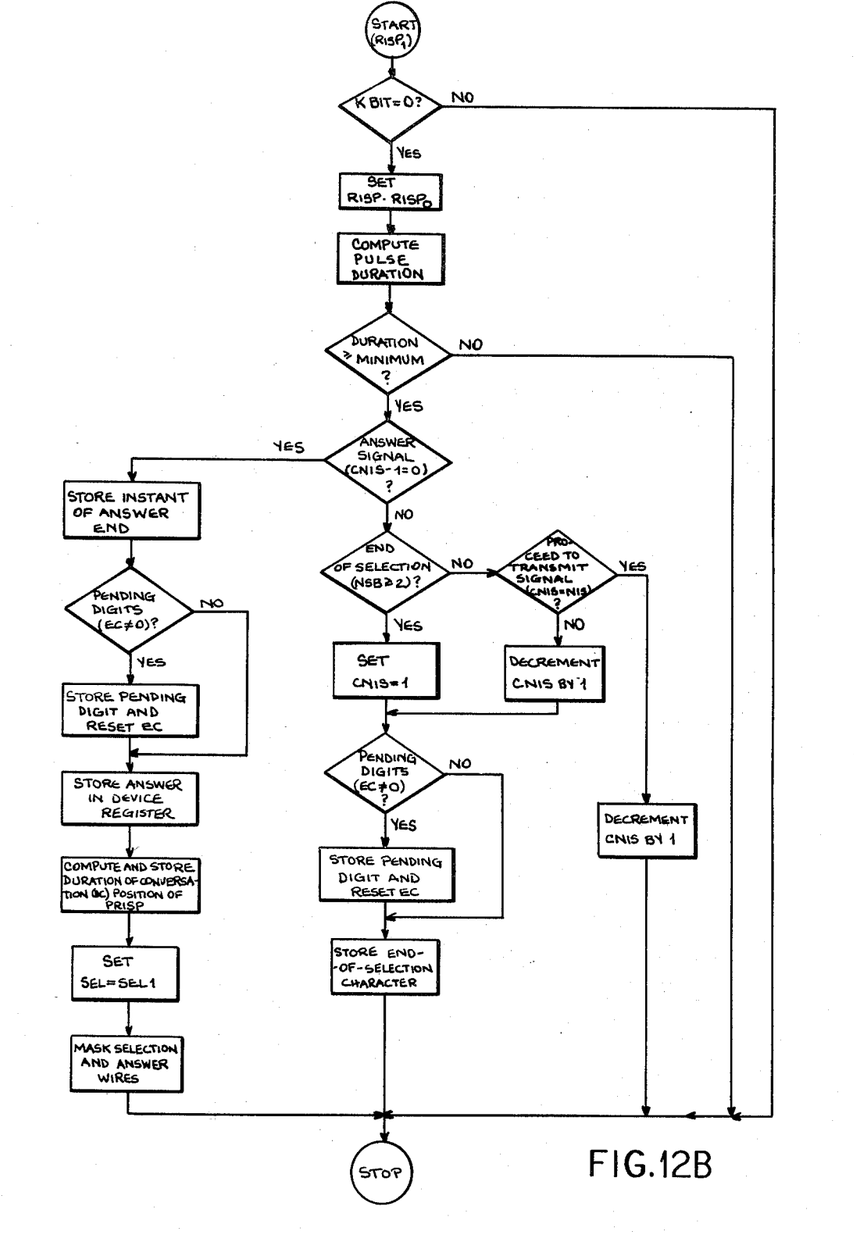

Answer (FIGS. 12A, 12B)

This microprogram again encompasses two subroutines, namely the one of FIG. 12A starting with state byte RISP$_0$ to process the beginning of a response pulse on the answer wire and the one of FIG. 12B which processes the end of that pulse and starts with a state byte RISP$_1$ It will be recalled that, in the seizure subroutine described with reference to FIG. 9A, the counter CNIS has been set to the value NIS representing the maximum number of pulses to be processed on this wire. The flow chart of FIG. 12A shows the setting of the state byte to RISP$_1$ when the corresponding bit of word K is found to have gone to 1.

The subroutine of FIG. 12B involves again the measurement of a pulse duration and the termination of the examination if that duration is below a certain minimum. If NIS=1, and after completion of the processing and storage of any pending call-number digit, the answer is entered in the device register, the position of word PRISP in the data store is registered and the computation of the length of conversation (DC) is initiated. The state word of the associated selection wire is set to SEL$_1$, preparatorily to the start of a new selection-processing microprogram, and the selection and answer wires are masked as discussed hereinabove.

In some exchanges, however, the response pulse on the answer wire may be preceded by other pulses which may include an end-of-selection signal if at least two digits have been stored in the device area. In such a case the word CNIS may have a higher initial value, e.g. 2, 3 or 4, and will be progressively decremented as likewise shown in FIG. 12B. Provision is also made in that instance for the storage of an end-of-selection character.

We claim:
1. A circuit arrangement for checking and recording voltage changes occurring at a multiplicity of sources in a telecommunication system, comprising a measuring unit which includes:
a multiplicity of voltage sensors connectable to respective sources and provided with outgoing leads carrying output voltages which vary within a predetermined range with the voltages of said sources, said outgoing leads being combined into sets each containing a plurality of leads whose output voltages alternate between predetermined levels;
a processor programmed to emit switching signals on a first output for cyclically scanning said sets of leads and to emit coded voltage thresholds coincidentally therewith on a second output, said sets of outgoing leads having respective voltage thresholds assigned thereto;
multiplexer means with a switching input connected to said first output, a multiplicity of arrays of data inputs respectively connected to said sets of leads and an output multiple carrying the output voltages of the currently scanned set of leads;
a digital/analog converter connected to said second output for translating said voltage thresholds into respective reference voltages lying between the predetermined voltage levels of the set of leads being scanned;
comparison means with inputs connected to said output multiple and to said digital/analog converter for delivering a multibit word to said processor in response to each emitted switching signal, each bit of said word representing in binary terms the relationship between the output voltage of a respective lead of the currently scanned set and the corresponding reference voltage; and
recording means controlled by said processor for registering the information conveyed by the bits of each word.

2. A circuit arrangement as defined in claim 1 wherein said sources are part of a plurality of signaling devices each containing several such sources, said processor being provided with a read/write memory having a first area allotted to the storage of raw data relating to the states of individual outgoing leads and of the voltage thresholds assigned to said sets, a second area allotted to the storage of processed data relating to individual devices, and a third area allotted to the storage of microprograms for the processing of said raw data.

3. A circuit arrangement as defined in claim 2 wherein said processor is further provided with a read-only memory for the loading of said microprograms into said third area of said read/write memory in a predetermined manner.

4. A circuit arrangement as defined in claim 3 wherein said processor is in two-way communication with said recording means for receiving program-modifying instructions therefrom.

5. A circuit arrangement as defined in claim 1, 2, 3 or 4 wherein said recording means comprises a magnetic-tape recorder.

6. A circuit arrangement as defined in claim 1, 2, 3 or 4 wherein said recording means comprises a character printer.

7. A circuit arrangement as defined in claim 1, 2, 3 or 4 wherein said processor is provided with an output bus, further comprising an ancillary unit controlled by said processor via said bus and inserted between said sources and a larger number of telephone lines for selectively connecting said sources to certain of said telephone lines.

8. A circuit arrangement as defined in claim 7 wherein said ancillary unit includes digitizing means for converting periodic signals of predetermined frequencies on said telephone lines into voltage pulses on said sources.

9. A circuit arrangement as defined in claim 7 wherein said ancillary unit includes a cascade of traffic-monitoring relays for sequentially connecting respective groups of said telephone lines to a group of measuring wires constituting said sources.

10. A circuit arrangement as defined in claim 9 wherein said ancillary unit further includes a first opto coupler for applying a test voltage to said measuring wires in response to commands from said processor and further includes a plurality of second opto couplers responsive to operation of certain of said relays for transmitting marking signals to said processor.

11. A circuit arrangement as defined in claim 5 wherein said processor is provided with an output bus, further comprising an ancillary unit including supplemental tape-recording means connected to said output bus for registering said conveyed information during cassette changes of said magnetic-tape recorder.

12. A circuit arrangement as defined in claim 1, 2, 3 or 4 wherein each of said sets consists of eight outgoing leads, said multibit word being an eight-bit byte.

* * * * *